Nov. 24, 1970    L. D. BRINKMAN    3,542,622
LAMINATING METHOD USING A SEGMENTED PRESSURE ROLLER
Original Filed March 9, 1967    2 Sheets-Sheet 1

INVENTOR.
LLOYD D. BRINKMAN
BY
*Lynn L. Foster*
ATTORNEY

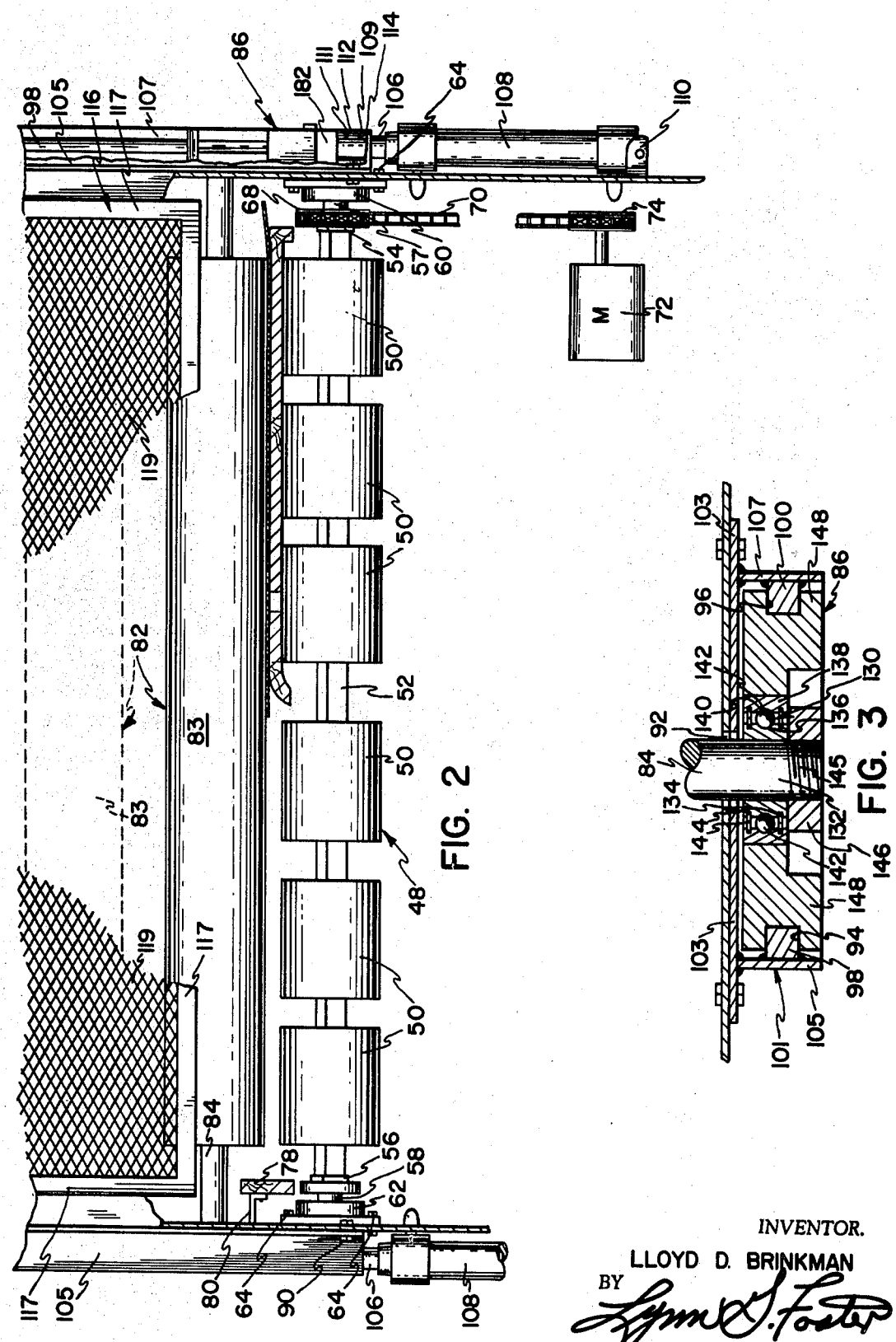

United States Patent Office 3,542,622
Patented Nov. 24, 1970

3,542,622
LAMINATING METHOD USING A SEGMENTED PRESSURE ROLLER
Lloyd D. Brinkman, Dallas, Tex., assignor, by mesne assignments, to Royal Industries, Pasadena, Calif., a corporation of Delaware
Original application Mar. 9, 1967, Ser. No. 621,908, now Patent No. 3,498,215. Divided and this application Apr. 28, 1969, Ser. No. 835,850
Int. Cl. B30b 3/00
U.S. Cl. 156—324          2 Claims

ABSTRACT OF THE DISCLOSURE

A pinch roller bonding method wherein opposed pressure is exerted upon a laminated workpiece by opposed spaced roll mechanisms as the workpiece is displaced between the roll mechanisms to affect the adhesion between laminae. Gathering or selectively locating the individual ones of a series of axially displaceable separate rollers comprising at least one of the roll mechanisms accommodates easy passage of workpiece protrusions through the roll mechanism between spaced rollers.

---

The application is a division of 621,908, filed Mar. 9, 1967, now Pat. No. 3,498,215.

This invention relates to a laminating method for applying opposed pressure forces upon selected locations of a laminated workpiece while accommodating passage of a workpiece protrusion between selectively spaced rollers to improve the bonding between laminated workpiece components. The invention also relates to a novel safety method which shields the operator from roll mechanisms and accommodates separation of the roll mechanisms in response to depression of the shield by the operator.

By way of example, in the art of laminating countertops, it is common to spread a layer of bonding agent over an upper surface of a base and over the undersurface of a plastic veneer and, after the bonding agent has dried sufficiently, to carefully bring the bonding agent on the veneer into contact with the bonding agent on base to permanently join the veneer in correct disposition to the base. The product is usually thereafter compressed for the purpose of removing air voids between the veneer and the base, so far as possible, to maximize the acceptability of the bond. Though not altogether satisfactory, hand rollers have often been used for this purpose. Use of machine-operated compression rollers for laminated countertop fabrication has been a problem, principally because of protruding backsplash and edge portions of the countertop. Such protruding portions have resulted in the rollers in the compression machine being cut or built up to form annular grooves to accommodate passage of the protruding portions through the machine. Rollers that have been so modified to provide fixed annular grooves are not capable of satisfactorily compressing countertops of all sizes because for each size a new groove or grooves must be provided, as described, which inherently reduces the surface area of the roller that will contact and compress the laminated workpiece.

With the foregoing in mind, it is a primary object of this invention to provide a compression roll method capable of compressing laminated workpieces of almost any size, such as countertops, without mechanical modification to roll apparatus and without reduction in the surface area of the rolls which compress the workpieces.

One presently preferred embodiment of the invention utilizes two opposed, spaced roll mechanisms, one of which has a fixed axis of rotation and is driven by a motor through a chain and sprocket or like drive. One roll mechanism comprises a series of axially displaceable, comparatively short rollers loosely arranged end to end, so as to be somewhat axially independent of each other. The rollers simultaneously rotate as a single unit. Accordingly, the relative transverse positions of the rollers may be selectively changed and the rollers grouped to accommodate both placement of a workpiece protrusion between two rollers and the imposition of generally uniform opposed pressure on opposite sides of the workpiece as the workpiece is displaced through the apparatus. Essentially uniform pressure can be applied to a completely flat workpiece having no protrusion.

The second roll mechanism, which preferably can be located in any one of several operating positions, each at a different distance away from the first roll mechanism to pass workpieces of different thicknesses, is preferably freely rotatable and is not power-driven. Two-way hydraulic cylinders are journaled one to each end of the second roll mechanism to reciprocate the second roll mechanism between open and operating positions upon command by the operator.

A novel safety procedure accommodates instantaneous separation of the roll mechanisms when actuated by the operator, when and if the operator or a foreign object is inadvertently caught between the roll mechanisms during operation of the device. A safety gate projecting downwardly in front of the roll mechanisms is movably hinged at the upper portion of the apparatus in front of the roll mechanisms and biased away from the roll mechanisms. Under the safety gate is a switch which is actuated by manually depressing the screen. Actuation of the switch instantly causes the two-way cylinders to force the second roll mechanism to its most remote, open location, thereby releasing the operator or foreign object. Significantly, the actuation of the safety switch does not cause the bonding apparatus to be thereafter inoperable. Without subsequent adjustment, the second roll mechanism may be returned to the operating position by merely manually pressing a reset button and operation may be immediately resumed.

It is, therefore, another primary object of the present invention to provide a unique pressure-applying method, which assists in the fabrication of laminated workpieces of various configurations and sizes.

It is a further significant object of the present invention to provide a novel safety method for a pressure-applying apparatus which accommodates instant separation of the roll mechanisms at the election of the operator to minimize injury.

These and other objects and features of this invention will become apparent from the following description and appended claims taken in conjunction with the accompanying drawings wherein:

FIG. 2 is an enlarged front elevational view of the roll system with a laminated countertop interposed between the roll mechanisms, some parts being partially broken away for clarity and to depict operating and open positions of the upper roll mechanism;

FIG. 3 is an enlarged cross section taken along line 3—3 of FIG. 1; and

Figure 1:
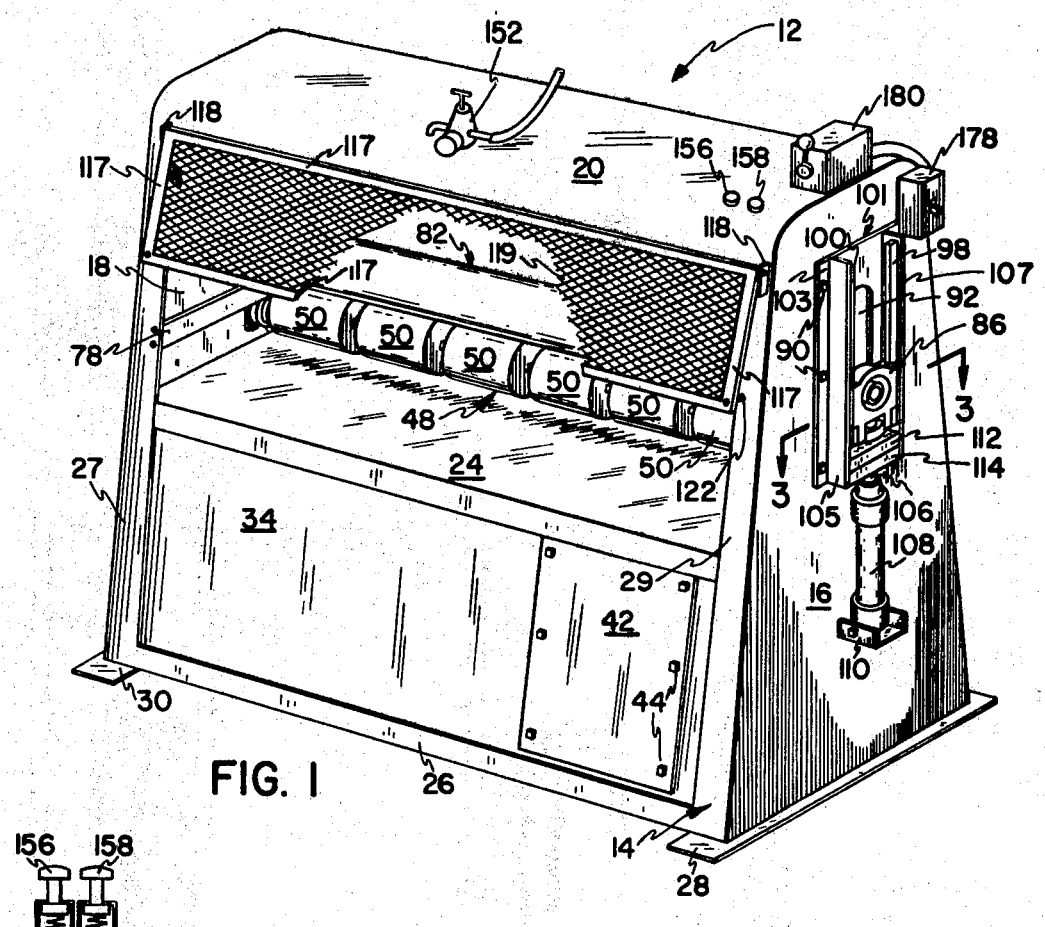
FIG. 1 is a schematic, perspective representation of the presently preferred embodiment of the invention partially broken away to expose the roll system.
Figure 4:
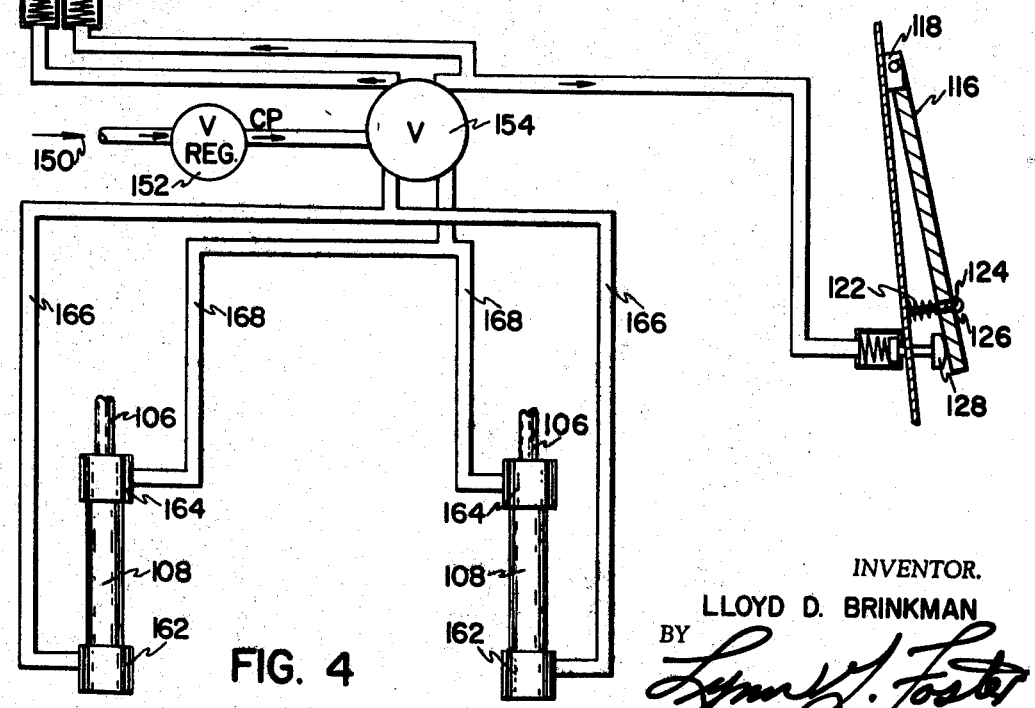

FIG. 4 diagrammatically depicts one presently preferred embodiment of a hydraulic system used in the embodiment of FIG. 1.

Reference is now made to FIG. 1 wherein a present embodiment of a pinch roller bonding device, generally designated 12, is shown in perspective. The device 12 generally comprises an integral metal frame 14 having parallel sides 16 and 18 that gradually taper so as to converge in an upward direction. The frame 14 further comprises a smoothly rounded top 20, an intermediate horizontal platform 24, laterally-extending front and back cross members 26, which integrally connect the sides 16 and 18 at their bases, and front and back face plates 27 and 29. The frame 14 is preferably unitarily constructed of ¼-inch plate steel and is integrally joined at the bottom of sides 16 and 18 to base support strips 28 and 30, for example by welding, to accommodate bolting of the device 12 to the floor. The portion of the frame 14 below the platform 24 is enclosed by front and rear face plates 34. Access to the portion of the frame 14 below the platform 24 may be obtained by removing a metal cover plate 42, held in position by cap screws 44 or the like, to expose an opening in the plate 34 behind the cover plate 42.

The frame 14 serves to support lower roll mechanism 48 and upper roll mechanism 82. Roll mechanism 48 comprises a series of axially-displaceable comparatively short rollers 50 having a common shaft 52 that is preferably square in cross sectional configuration. Each of the rollers 50 preferably comprises a surface of gum rubber and is loosely assembled on the shaft 52 in the axial direction. However, each roller 50 has a central metal through-bore which is square in cross section and size to match the shaft. Thus, each roller 50 is non-rotatably joined to and rotates with the shaft 52.

The ends of the shaft 52 are non-rotatably anchored in respective recesses of receiving or coupling members 54 and 56 (FIG. 2). The members 54 and 56 are respectively non-rotatably united with cylindrical bearing short shafts 57 and 58. The bearing shafts 57 and 58 are rotatably journaled to stationary bearing assemblies 60 and 62 that are fixed to the frame 14 by nut and bolt assemblies 64 or the like. Anti-friction roller bearings (not shown) in the journaled housings 60 and 62 accommodate relatively uninhibited rotation of the roll mechanism 48.

The receiving member 54 comprises an integral sprocket 68 around which a drive chain 70 passes. When chain 70 is rotated in either direction by reversible motor 72 through drive sprocket or pulley 74, the shaft 52 and the rollers 50 turn in the same direction. The motor 72 is preferably a commercially available constant speed electric motor, for example, No. H1013614, Type MTFGW ⅓ horsepower, 1800 r.p.m., manufactured by U.S. Syncrogear Motors. The motor 72 is preferably anchored to a lower portion of the frame 14 immediately adjacent to the cover plate 42 for easy access. Electrical power is supplied to the motor 72 from any suitable source when a conventional power switch 178 is placed in "on" position. The direction of drive is determined by a reversing drum switch 180, such as the class 2601 reversing drum switch, size 0, Type A6–2; manufactured by Square D Company. An abutment piece 78 is suspended by angle support which is suitably fixed to the frame 14. The abutment piece 78 can be used as guide for certain types of workpieces to maintain a constant orientation as the workpiece is displaced between the roll mechanisms.

The upper roll mechanism 82 preferably comprises a single roller 83 formed of a gum rubber surface and is axially displaceable along and may be freely rotatable on or with the shaft 84. The shaft 84 extends at its ends through an elongated slot 92 (FIG. 1) in each of the side surfaces 16 and 18 and is rotatably journaled at each end in a vertically displaceable bearing housing 86.

Each bearing housing 86 (best shown in FIG. 3) comprises a bearing assembly 130 which is concentric with the terminal portion 132 of the bearing shaft 84. Each bearing assembly 130 comprises an inner race 134 having a groove 136 and an outer bearing race 138 having a groove 140. Ball bearings 142 are situated between and run on the matching grooves 136 and 140 of bearing races 134 and 138 to accommodate free rotation of the bearing shaft 84. Circular seals 144 prevent against foreign particles entering the bearing assembly 130 and retain lubricant. A threaded bearing retainer 146, threadedly joined to each threaded end 145 of shaft 84, maintains the bearing assembly 130 in its proper operating location and prevents axial displacement of the bearing shaft 84.

Each bearing assembly 130 is press-fit within a bearing jacket 148, which is provided with linear grooves 94 and 96 that run along rails 98 and 100. The tracks 98 and 100 remain stationary because they are respectively fixed, as by welding, to a bracket 101, which comprises a slotted base plate 103 bolted at 90 or otherwise fastened to the frame sides 16 and 18, and vertically parallel integral rail supports 105 and 107.

Attached to the lower portion of each bearing housing 86, as by welding, is a piston rod 106 comprising part of a two-way pneumatic cylinder 108. Although any suitable two-way hydraulic cylinder could be used, one preferred cylinder is the Sargent Engineering Corporation two-way hydraulic cylinder Ser. No. 3135, which has a recommended pressure of 3,000 p.s.i. Each hydraulic cylinder 108 is pivotally anchored to the adjacent frame side by a bracket 110 in a conventional way. Each piston rod 106 freely passes through an aperture 109 in a stationary block 114 and an aperture 111 in a second stationary block 112. Both blocks 112 and 114 serve as spacers between rails 98 and 100. Thus, as the two hydraulic cylinders are simultaneously actuated, the two bearing housings 86 are vertically displaced along with the upper roll mechanism 82 from an operating position (shown in solid lines in FIG. 2) to a remote, open position (shown in dotted lines in FIG. 2). Relative movement of the roll mechanism 82 is controlled by use of buttons 156 and 158 on the upper surface 24 of the frame 14. These buttons comprise part of the hydraulic or pneumatic system and control the flow of compressed air, originating from a suitable compressed air source (not shown), to the cylinders 108. The hydraulic or pneumatic system will be described in greater detail hereinafter.

A safety gate 116, integrally comprising a frame 117 and a grating 119, is connected to the top 20 of the roll frame 14 by hinges 118 (FIG. 1). Thus, the gate 116 extends downwardly in front of the roller system 46 a sufficient distance to shield the operator from the high speed roll mechanisms 48 and 82 and still accommodate handy insertion of laminated workpieces between the roll mechanisms. The safety gate 116 is biased away from the roll mechanisms 48 and 82 near the lower part of the gate by resilient, conical compression springs 122, which springs can be easily manually compressed. Each spring 122 is concentric of a pin 124 which is immovably fixed to the frame 14 and passes through an aperture 126 of the gate frame 117. A depressible plunger 128 freely passes through the frame 14 adjacent part of the safety gate 116 so as to be opened when the screen is displaced counter to the bias of springs 122. This actuates the two-way cylinders 108 and, thereby, forces the upper roll mechanism 82 from an operating position to a location remote from the lower roll mechanism 48 thereby forcefully separating the roll mechanisms 48 and 82.

Reference is now made particularly to FIG. 4, which depicts a schematic representation of the hydraulic or pneumatic system of the embodiment of FIGS. 1–3. Compressed air entering at arrow 150 is passed through a constant pressure valve 152 and into a directional spool valve 154. An example of a suitable directional spool valve is Valve No. 31509–9000 manufactured by A. Schrader's Son, a Division of Schovil Manufacturing Company, Inc. of New York, although any other suitable multi-directional valve could be used. The influent compressed air is used to actuate the pneumatically controlled hydraulic cylinders 108. For example, when button or plunger 156 is depressed, air in the system escapes from the opening at button 156 and a spool (not shown) in the valve 154 is displaced, by pressure differential created by the escaping air, to a location which (a) vents air from the back end 162 of both cylinders 108 through lines 166 and (b) delivers air under pressure to the piston end 164 of both cylinders 108 through lines 168. This retracts the piston rods 106, drawing the upper roll mechanism 82 toward the roll mechanism 48. A spacer block 182, suitably sized for a particular workpiece to be fabricated is placed between at least one and preferably both bearing housings 86 and the block 112. Different sized spacers may be used for different sized workpieces. This correctly situates the top roll mechanism 82 in spaced operating position from the lower roll mechanism 48. When the button 156 is thereafter closed, the pressure system maintains the roll mechanism 82 in the mentioned operating position.

When button 158 is depressed, the spool of valve 154 is shifted by the pressure differential caused by air escaping through the opening at button 156 so that air is vented from the piston end 164 of the two cylinders 108 through lines 168 and air under pressure is delivered to the back end 162 of the two cylinders 108 through lines 168. This fully extends the piston rods 106 and elevates the upper roll mechanism 82 to its most remote, open position. Depression of the safety button 128 by actuation of the safety gate 116 likewise forces the roll mechanism 82 into the fully open position.

In the operation of the present invention, the operator establishes the desired pressure setting on the constant pressure valves 152 and then depresses the button 158 to elevate the upper roll mechanism 82 to its most remote, open location. The spacer 182 (FIG. 3) of satisfactory size is inserted between at least one support block 112 and the adjacent elevated bearing housing 86. The vertical dimension of the spacer 182 will be such that a suitable pressure will be exerted on the workpiece to be fabricated as the workpiece is passed between the roll mechanisms. The operator then axially adjusts the relative positions of the rollers 50 along the shaft 52 to (a) accommodate exertion of a generally uniform pressure on the generally flat areas of the workpiece and (b) simultaneously facilitate the passage of protrusions of the workpiece between spaced rollers 50. The upper roll mechanism 82 is then lowered until the lower portion of the bearing housing 86 forcibly abuts the spacer 182 such that the correct spacing exists between the upper and lower roll mechanisms. The upper roll mechanism 82 is biased in the mentioned operating position by force of air under pressure acting at the piston end 164 of both cylinders 108. The amount of pressure depends on the setting of valve 152. The roll system is now ready to process one or a series of similar workpieces. The motor 72 is energized by the power switch 178 and the direction of roller rotation is determined by setting the reversing drum switch 180.

The leading edge of the workpiece is placed between the roll mechanisms and is gripped by the rubber surface of the rollers 50. The workpiece is thus displaced between the roll mechanisms by the power rotation of the lower roll mechanism 48. As the workpiece is so displaced, it causes opposite rotation of the upper idler roll mechanism 82. In this way, the generally planar parts of the workpiece will be subjected to opposed, essentially uniform roll pressure, for the purposes earlier stated and workpiece protrusions will freely pass through the roll mechanism between the selectively spaced rollers 50.

In the event that the operator or his clothing or any undesired object should inadvertently be caught between the roll mechanisms during operation, the operator may simply depress the safety screen 116 with any available part of his body to actuate the safety button 128 and force the upper roll mechanism 82 to its open position, thus releasing the operator, his clothing or the undesired object.

From the foregoing description, it is evident that the presently preferred embodiment of the pinch roller apparatus 12 uniquely comprises a pressure-applying device in which rollers 50 and roll mechanism 82 may be easily and rapidly positioned to accommodate compressed passage of a workpiece, such as countertop having protruding backsplash and edge portions or various other configurations. Moreover, the rollers 50 and associated roll mechanism 82 may be axially grouped to compress the maximum surface area of workpieces of widely varying sizes and to freely pass workpiece protrusions between selectively spaced rollers 50. Thus, a novel apparatus and method of insuring a suitable bond between laminae are provided.

The safety gate 116 and associate structure dually shields an operator against catching his fingers or the like between the roll mechanisms and responds to slight pressure from the operator to instantly elevate the roll mechanism 82 to its open, harmless position, should the operator catch his fingers or the like between the roll mechanisms. Consequently, the possibility of the operator becoming seriously injured by the roll mechanisms is significantly reduced, if not eliminated.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a method of pressing a veneer on a surface of a generally planar base, following interposing of bonding agent between the veneer and the base, to form a laminated end product, which has at least one non-planar protrusion, using spaced opposed roller mechanisms at least one of which is driven and the other one of which comprises separate axially displaceable roller segments capable of being axially spaced one from another at selected distances the steps of: axially positioning the roller segments arbitrarily thereby varying the spacing between roller segments to accommodate unencumbered passage of the protrusion between two selected spaced roller segments; inserting the leading edge of the laminated product between the spaced roller mechanisms; simultaneously (a) displacing the laminated product between the roller mechanisms by rotation of at least one driven roller in friction contact with the product, (b) imposing a generally uniform pressure substantially perpendicular upon the opposed generally planar surfaces of the laminated product to enhance the bond therebetween and (c) passing said protrusion between the mentioned roller segments so as to avoid exerting pressure thereon.

2. In a method as defined in claim 1 further comprising the steps of adjusting the axial distance of separation of the roller mechanisms one from the other to accommodate processing of laminated products having one of several predetermined thicknesses.

References Cited

UNITED STATES PATENTS

| | | | |
|---|---|---|---|
| 1,603,142 | 10/1926 | Murray | 156—324 X |
| 1,653,481 | 12/1927 | Spargo. | |
| 2,086,187 | 7/1937 | Norton | 161—270 X |
| 2,247,874 | 7/1941 | Crites | 29—125 X |
| 2,444,918 | 7/1948 | Cone | 156—324 |
| 2,785,083 | 3/1957 | Robinson | 156—295 X |
| 2,893,905 | 7/1959 | Makovic et al. | 100—155 |
| 3,351,001 | 11/1967 | Achkio | 29—125 X |
| 3,449,193 | 6/1969 | Bratton et al. | 156—324 X |

CARL D. QUARFORTH, Primary Examiner

F. M. GITTES, Assistant Examiner

U.S. Cl. X.R.

29—125; 100—170